US012388204B2

(12) United States Patent
Wang et al.

(10) Patent No.: US 12,388,204 B2
(45) Date of Patent: Aug. 12, 2025

(54) BUS CONNECTING CABLE

(71) Applicant: JESS-LINK PRODUCTS CO., LTD., New Taipei (TW)

(72) Inventors: Wen-Yu Wang, New Taipei (TW); Chieh-Ming Cheng, New Taipei (TW)

(73) Assignee: JESS-LINK PRODUCTS CO., LTD., New Taipei (TW)

(*) Notice: Subject to any disclaimer, the term of this patent is extended or adjusted under 35 U.S.C. 154(b) by 312 days.

(21) Appl. No.: 18/211,221

(22) Filed: Jun. 16, 2023

(65) Prior Publication Data

US 2024/0356252 A1 Oct. 24, 2024

(30) Foreign Application Priority Data

Apr. 21, 2023 (TW) ................................ 112114930

(51) Int. Cl.
*H01R 12/00* (2006.01)
*H01R 12/70* (2011.01)
*H01R 12/72* (2011.01)

(52) U.S. Cl.
CPC ....... *H01R 12/7047* (2013.01); *H01R 12/707* (2013.01); *H01R 12/727* (2013.01); *H01R 2201/06* (2013.01)

(58) Field of Classification Search
CPC ............................ H01R 12/707; H01R 12/727
See application file for complete search history.

(56) References Cited

U.S. PATENT DOCUMENTS 7,789,700 B2 * 9/2010 Wang ..................... H01R 12/78 439/507
9,312,620 B2 * 4/2016 Chen .................. H01R 13/5812
10,425,035 B2 * 9/2019 Corneille .............. H10F 77/939
10,940,843 B2 * 3/2021 Ganzel .................. B60T 13/745
10,981,552 B2 * 4/2021 Ganzel .................. B60T 13/166
2010/0062636 A1 * 3/2010 Wang ..................... H01R 12/62 439/493
2024/0356252 A1 * 10/2024 Wang ................ H01R 12/7047

FOREIGN PATENT DOCUMENTS

TW M334509 U 6/2008
TW M603631 U 11/2020

OTHER PUBLICATIONS

Office Action dated Jun. 5, 2024 of the corresponding Taiwan patent application No. 112114930.

* cited by examiner

*Primary Examiner* — Phuong Chi Thi Nguyen
(74) *Attorney, Agent, or Firm* — Chun-Ming Shih; HDLS IPR SERVICES

(57) ABSTRACT

A bus connecting cable includes a circuit board, a connector, circuits and a cable. The circuit board includes a top surface and a bottom surface. The connector on the top surface includes first terminals and second terminals. The circuits are arranged on the circuit board and include first circuits and second circuits. Each first circuit penetrates the circuit board and includes a first top end and a first bottom end. The first top ends are respectively connected to the first terminals. Each second circuit penetrates the circuit board and includes a second top end and a second bottom end. The second top ends are respectively connected to the second terminals. The first bottom ends and the second bottom ends are arranged along the bottom surface. The cable includes conductors. Each conductor is soldered to the first bottom ends and the second bottom ends.

13 Claims, 11 Drawing Sheets

BUS CONNECTING CABLE

BACKGROUND

Technical Field

The disclosure relates to a bus connecting cable, particularly to a bus connecting cable with uniform electrical characteristics.

Related Art

According to related-art shown in FIGS. 1 to 4, a PCIe cable assembly is generally used for plugging into a bus connector on a computer motherboard. Generally speaking, the cable assembly includes multiple conductors 10 and a circuit board 20, and a connector 30 is arranged on the circuit board 20. This connector 30 usually has two parallel rows of terminals, and the circuit board 20 is printed with various circuits corresponding to the two rows of terminals respectively. According to various configuration of the connector 30 on the circuit board 20, it may be roughly divided into two types, which are a straddle structure having the two rows of terminals welded on two surfaces of the circuit board respectively, and a stand structure having a connector standing on one surface of the circuit board (referred to a top surface 21 hereinafter).

This disclosure is related to an improvement of the stand structure. The stand structure has circuits printed on two surfaces of the circuit board corresponding to the two rows of terminals. The circuits are respectively extended to the same side edge of the circuit board 20 for soldering with each conductor 10. The circuit of one of the rows of terminals (referred to rear row terminals 31 hereinafter), which are away from the side edge, needs to cross the other row of terminals (referred to front row terminals 32 hereinafter). The circuits are extended to penetrate the circuit board 20 through via holes penetrating the circuit board 20, the circuit passing the via holes have discontinuous impedances, and the discontinuous impedance seriously reduces the quality of signal transmission between each terminal and its corresponding conductor. Therefore, the signal transmission qualities in the two rows of terminals are ununiform. Various stand structures according to related art are described below.

According to a bus connection cable of related art shown in FIGS. 1 and 2, the rear row terminals 31 are extended to form circuits penetrating the circuit board 20 and the circuits are extended to the corresponding conductors 10 respectively along the other surface (referred to a bottom surface 22 hereinafter) of the circuit board 20. The front row terminals 32 are extended to form circuits directly extended to the corresponding conductors 10 along the top surface 21 of the circuit board 20, and the circuits on the top surface 21 may have better signal transmission quality than that on the bottom surface 22. The circuits of the rear row terminals 31 are extended to penetrate the circuit board 20 through the via holes. Once the circuits pass through the via hole, the impedance oscillation may be increased and the transmission qualities of the signal between the rear row terminals 31 and the corresponding conductors may be seriously decreased. Therefore, the signal transmission qualities of the two rows of terminals are ununiform. Moreover, soldering spots 41 disposed on the top surface 21 of the circuit board 20 corresponding to the front row terminals 32 for soldering with the conductors 10 correspondingly and soldering spots 42 disposed on the bottom surface 22 of circuit board 20 corresponding to the rear row terminals 31 for soldering with the conductors 10 correspondingly are disposed in a symmetrical arrangement. Therefore, the conductors 10 should be integrated into two rows of cables 11 and 12 overlapped with each other, so that the stack of the conductors 10 is thick. When the conductors 10 are bent, bending radii of the two rows of cables 11 and 12 are ununiform, and a cabling arrangement is not aesthetic.

According to a bus connection cable of related art as shown in FIGS. 3 and 4, the rear terminals 31 are respectively extended to form circuits to the conductors 10 corresponding thereto along the bottom surface 22 of the circuit board 20, and the front row terminals 32 are respectively extended to form circuits to the conductors 10 corresponding thereto directly along the top surface 21 of the circuit board 20. The soldering spots 41 corresponding to the front row terminals 32 disposed on the top surface 21 of the circuit board 20 for soldering with the conductors 10 and the soldering spots 42 corresponding to the rear row terminal 31 disposed on the bottom surface 22 of the circuit board 20 for the soldering with the conductors 10 are in the same row, so that the conductors 10 are integrated in the same row of cable 13. Therefore, the cable is not stacked, and the bending radius of each conductor 10 may be uniform when the row of cable 13 is bent. However, the layout of the circuits on the circuit board 20 is limited. The soldering spots 41, 42 are segmentally and alternately disposed, and this arrangement leads to a large offset between the soldering spots 41, 42 and the corresponding terminals 31, 32. Therefore, the circuits on two sides of the circuit board 20 need to be extended, and this leads to greater loss of signal transmission.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

The disclosure provides a bus connecting cable with uniform electrical characteristics.

The disclosure provides a bus connecting cable, which includes a circuit board, a connector, multiple circuits and a cable. The circuit board includes a top surface and a bottom surface opposite to the top surface. The connector is upright arranged on the top surface and includes multiple first terminals in a row and multiple second terminals in a row. The circuits are arranged on the circuit board and include multiple first circuits and multiple second circuits. Each first circuit penetrates through the circuit board. Each first circuit includes a first top end on the top surface and a first bottom end on the bottom surface. The first top ends are respectively connected to the first terminals. Each second circuit penetrates through the circuit board. Each second circuit includes a second top end on the top surface and a second bottom end on the bottom surface. The second top ends are respectively connected to the second terminals. The first bottom ends and the second bottom ends are alternately arranged in a row along the bottom surface. The cable includes multiple conductors parallelly connected to each other. Each conductor is soldered to the first bottom ends and the second bottom ends respectively.

In an embodiment of the disclosure, the first bottom ends and the second bottom ends are alternately arranged in a row.

In an embodiment of the disclosure, the conductors in the cable are disposed side by side in a row to be a band shape, and the conductors are sequentially soldered to the first bottom ends and the second bottom ends arranged alternately.

In an embodiment of the disclosure, the circuit board is of a strip shape and includes a component side and a wiring side opposite to the component side, the row of first top ends and the row of second top ends are arranged at an interval and respectively extended along the component side, and the row of second top ends is more adjacent to the wiring side than the row of first top ends.

In an embodiment of the disclosure, the first bottom ends and the second bottom ends are arranged along the wiring side.

In an embodiment of the disclosure, each first circuit includes a first extending segment, the first extending segment is connected between a corresponding pair of the first top end and the first bottom end in each first circuit, and each first extending segment is extended along the bottom surface to cross the connector.

In an embodiment of the disclosure, corresponding to the circuits, the circuit board has a plurality of via holes penetrating the circuit board, and the plurality of via holes have a plurality of first via holes corresponding to the first circuits respectively. In each first circuit, the first top end has a front edge and a rear edge, the front edge of the first top end is closer to the wiring side than the rear edge of the first top end, the first bottom end has a front end and a rear end, the front edge of the first bottom end is closer to the wiring side than the rear edge of the first bottom end. The first terminal corresponding to the first circuit has a distal end extended from the front edge of the first top end to the rear edge of the first top end. The first via hole corresponding to the first circuit penetrates the circuit board from the rear edge of the first top end.

In an embodiment of the disclosure, each first circuit has a first extending segment. In each first circuit, the first extending segment is connected between the first top end and the first bottom end, the first extending segment of the first circuit is extended from the rear edge of the first top end through the first via hole and further extended toward the wiring side along the bottom surface of the circuit board to the rear edge of the first bottom end.

In an embodiment of the disclosure, the circuit board has a plurality of via holes penetrating the circuit board corresponding to the circuits, and the plurality of via holes have a plurality of second via holes corresponding to the second circuits respectively. In each second circuit, the second top end has a front edge and a rear edge, the front edge of the second to end is closer to the wiring side than the rear edge of the second top end. The second bottom end has a front end and a rear end, and the front edge of the second bottom end is closer to the wiring side than the rear edge of the second bottom end. The second terminal corresponding to the second circuit has a distal end extended from the rear edge of the second top end to the front edge of the second top end. The second via hole corresponding to the second circuit penetrates the circuit board from the rear edge of the second bottom end.

In an embodiment of this disclosure, each second circuit has a second extending segment. In each second circuit, the second extending segment is connected between the second top end and the second bottom end, the second extending segment of the second circuit is extended from the front edge of the second top end to the second via hole along the top surface of the circuit board and further extended through the second via hole to connected to the rear edge of the second bottom end.

In an embodiment of the disclosure, the bus connecting cable further includes a positioning block disposed on the wiring side of the circuit board, part of an edge of the circuit board is buried in the positioning block, part of each conductor is buried in the positioning block, each conductor includes a soldering end projecting from the positioning block, and each soldering end is soldered to a corresponding one of the first bottom ends or the second bottom ends. The bus connecting cable further includes a pair of shells, the pair of shells clamp the wiring side of the circuit board, and the positioning block is received in the shells. The soldering ends are received in the shells.

In an embodiment of the disclosure, each of the shells has an avoiding opening, the circuits are disposed separately from the corresponding shells through the avoiding openings.

In an embodiment of the disclosure, the circuit board has a plurality of via holes penetrating the circuit board corresponding to the circuits, and each circuit passes through one of the via hole.

In the bus connecting cable of the disclosure, all of the first circuit and the second circuit penetrate through the circuit board, so that signals transmitted in the first circuit and the second circuit have losses equal to each other when penetrating the circuit board. Therefore, transmission qualities of the signals in the first circuit and the second circuit are kept uniform.

DETAILED DESCRIPTION

Figure 1:
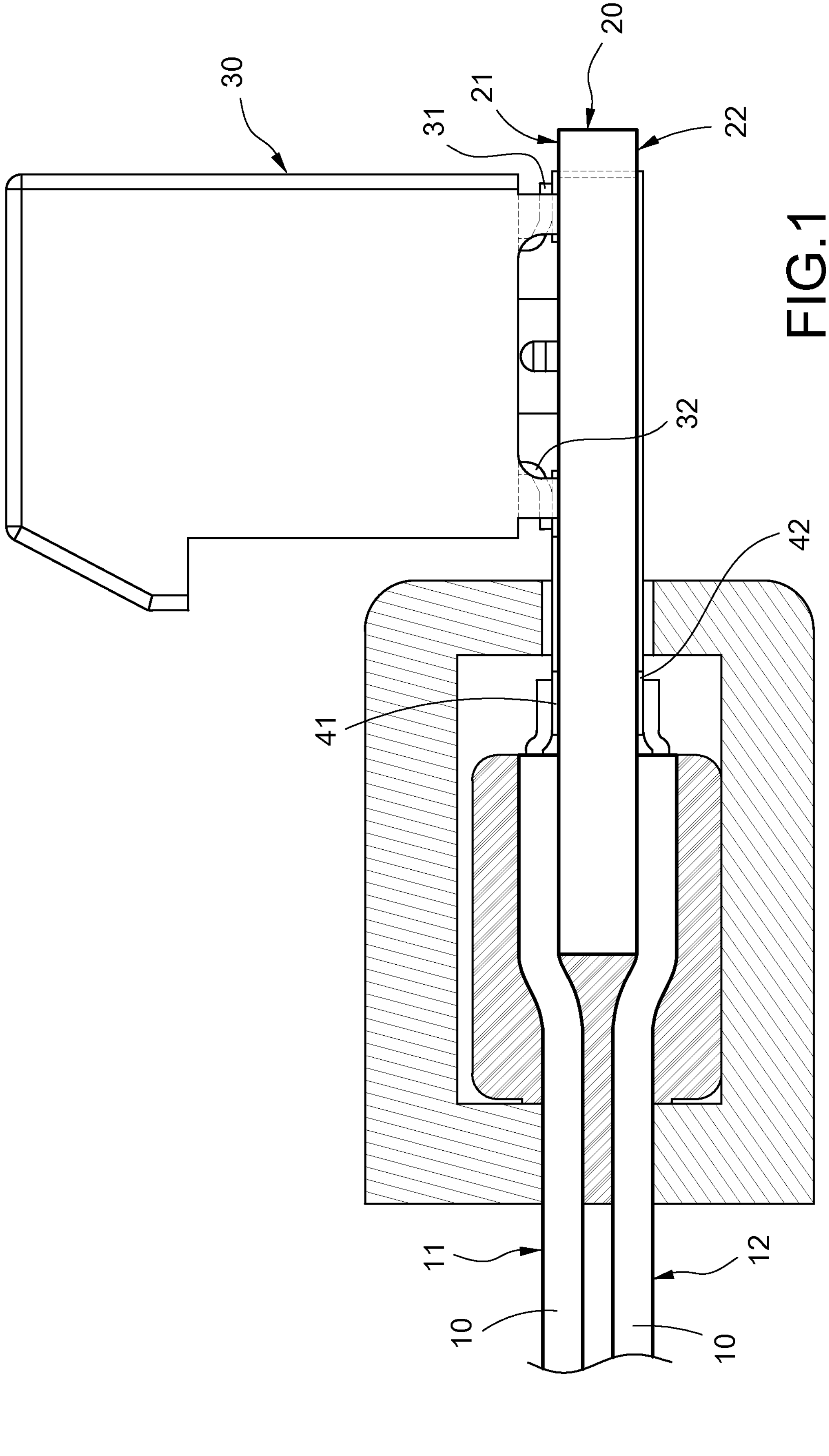
FIG.1 (Related Art)
FIGS. 1 and 2 are perspective views showing a related-art bus connecting cable.
Figure 2:
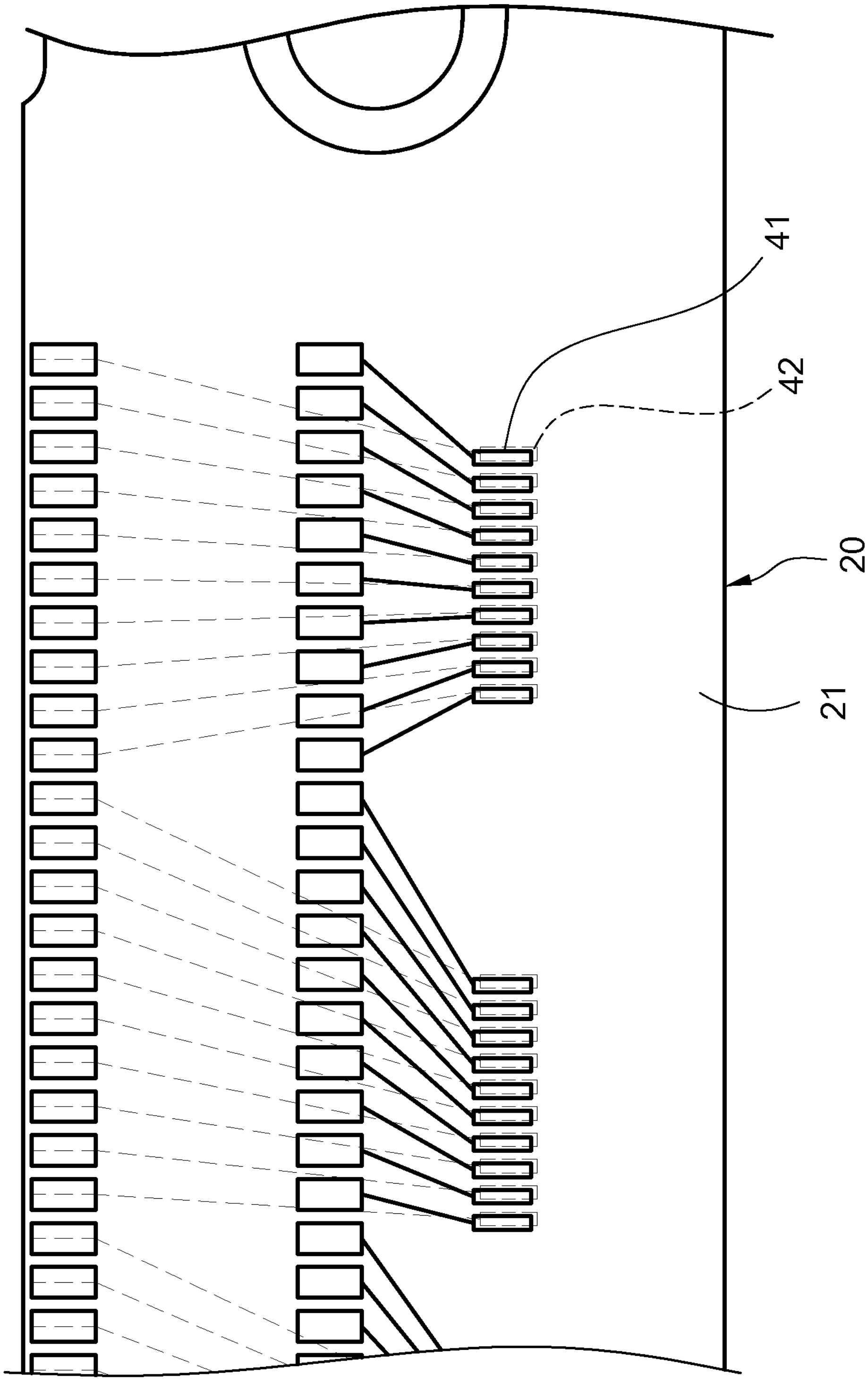
FIG.2 (Related Art)
Figure 3:
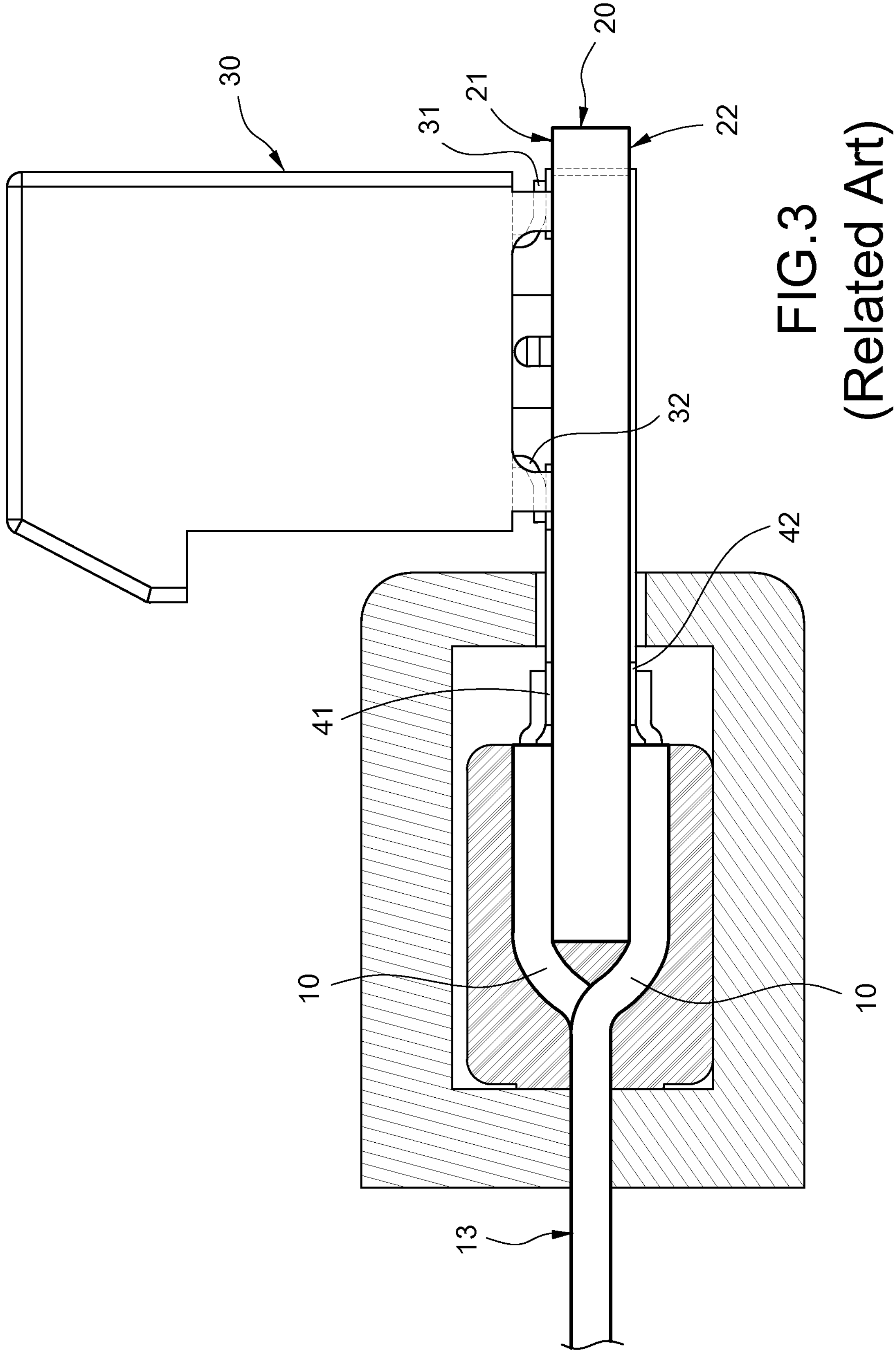
FIG.3 (Related Art)
FIGS. 3 and 4 are perspective views showing another related-art bus connecting cable.
Figure 4:
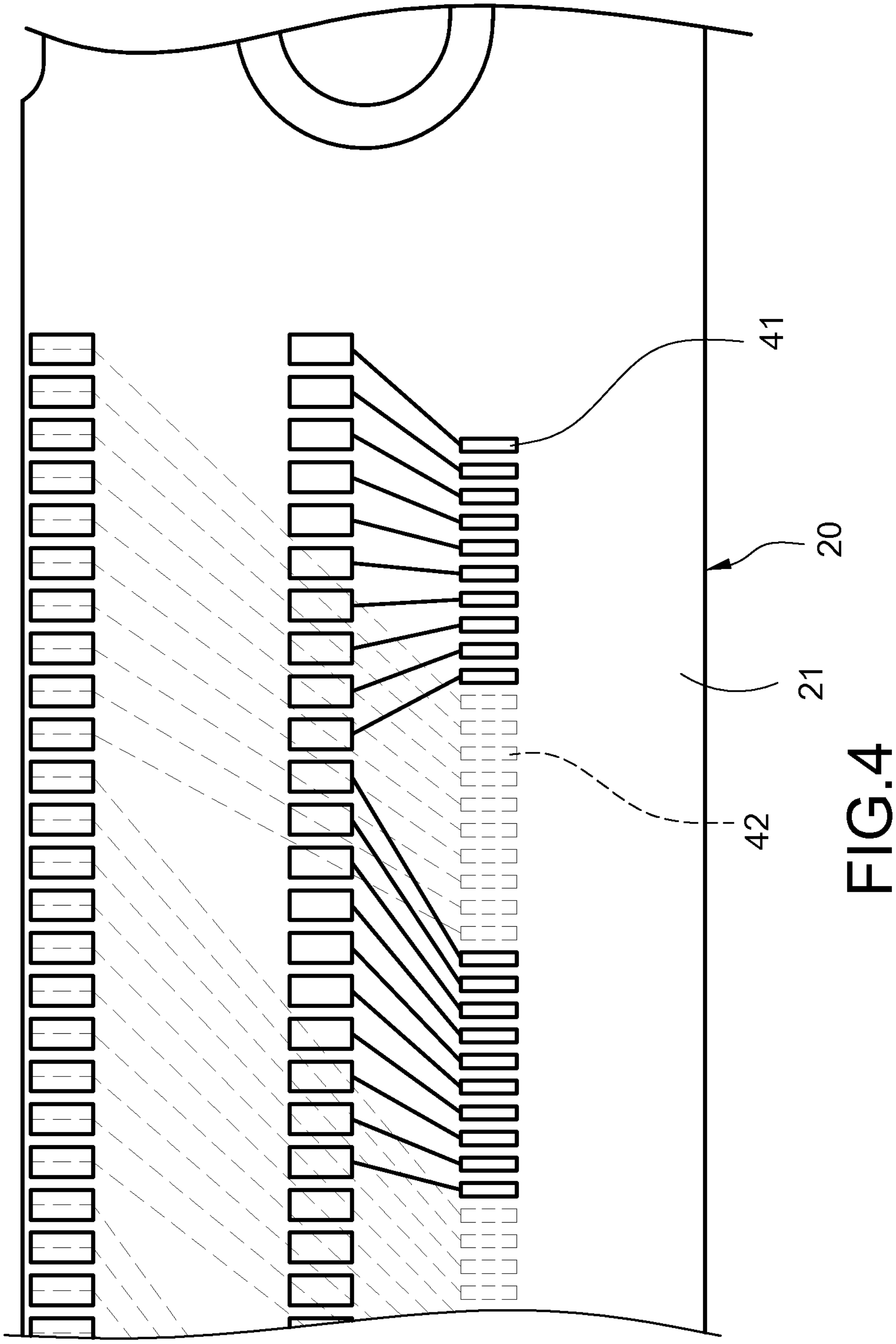
FIG.4 (Related Art)
Figure 5:
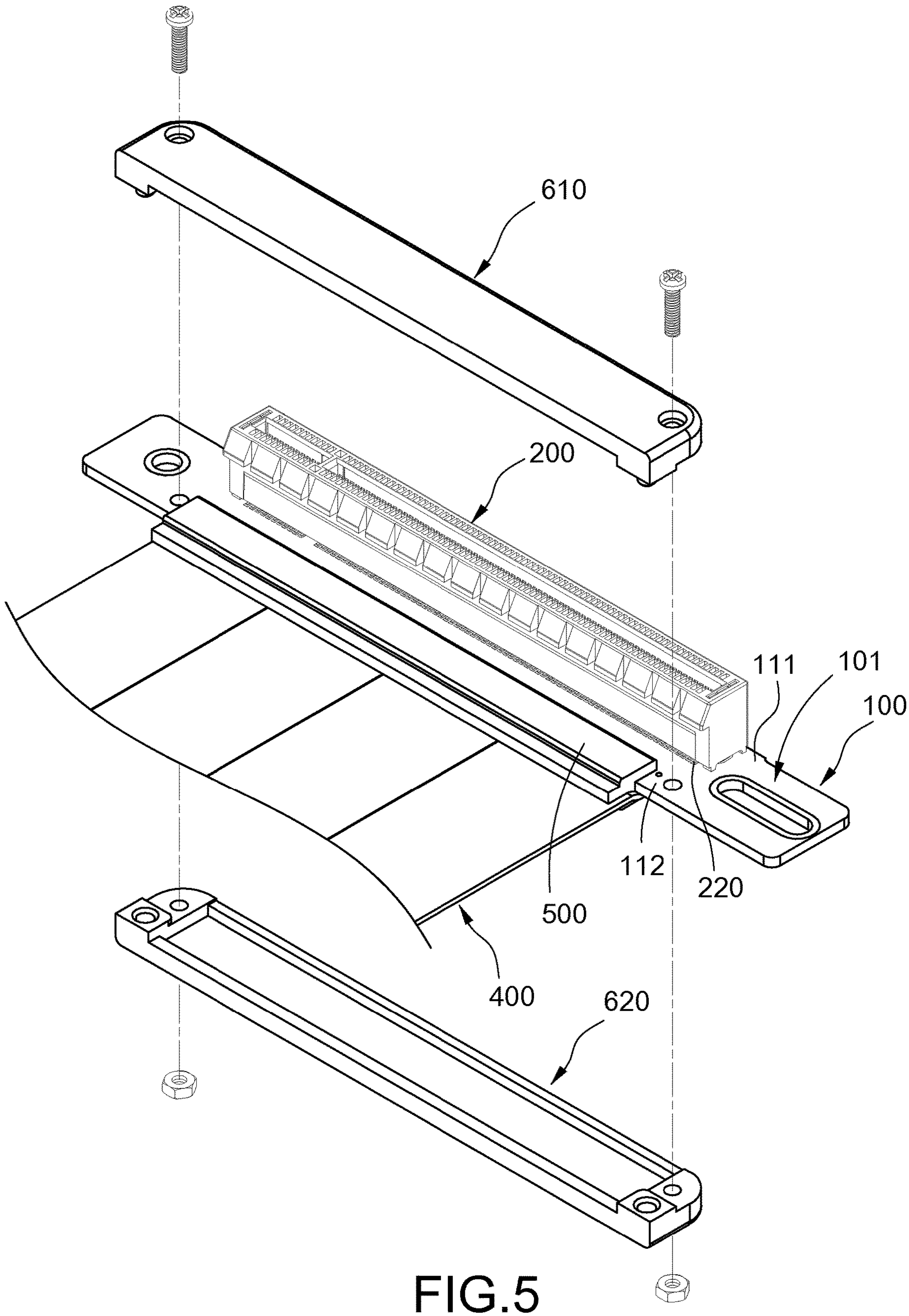
FIG. 5 is an exploded view of the bus connecting cable of the disclosure.
Figure 6:
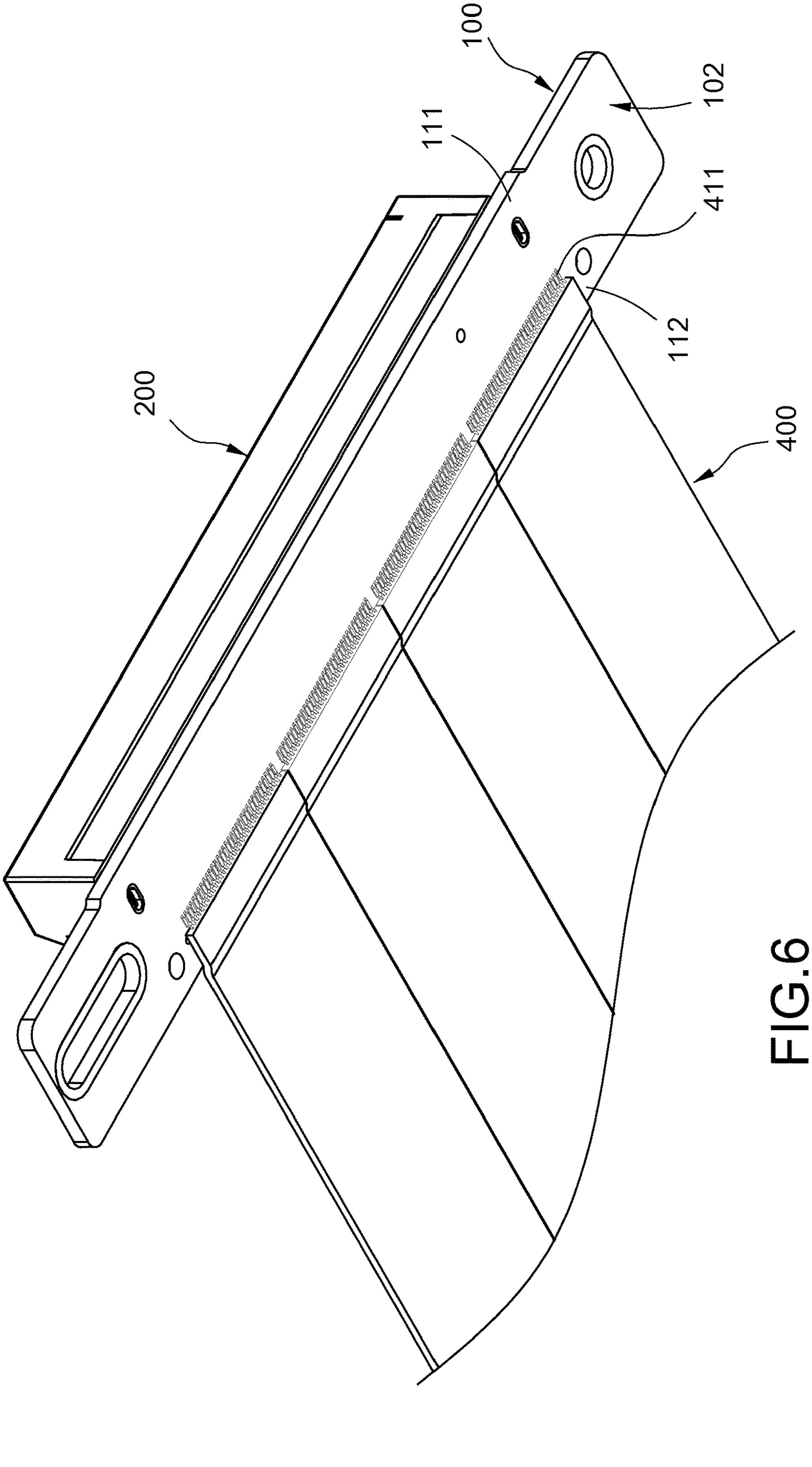
FIG. 6 is a schematic view of some elements of the bus connecting cable of the disclosure.
Figure 7:
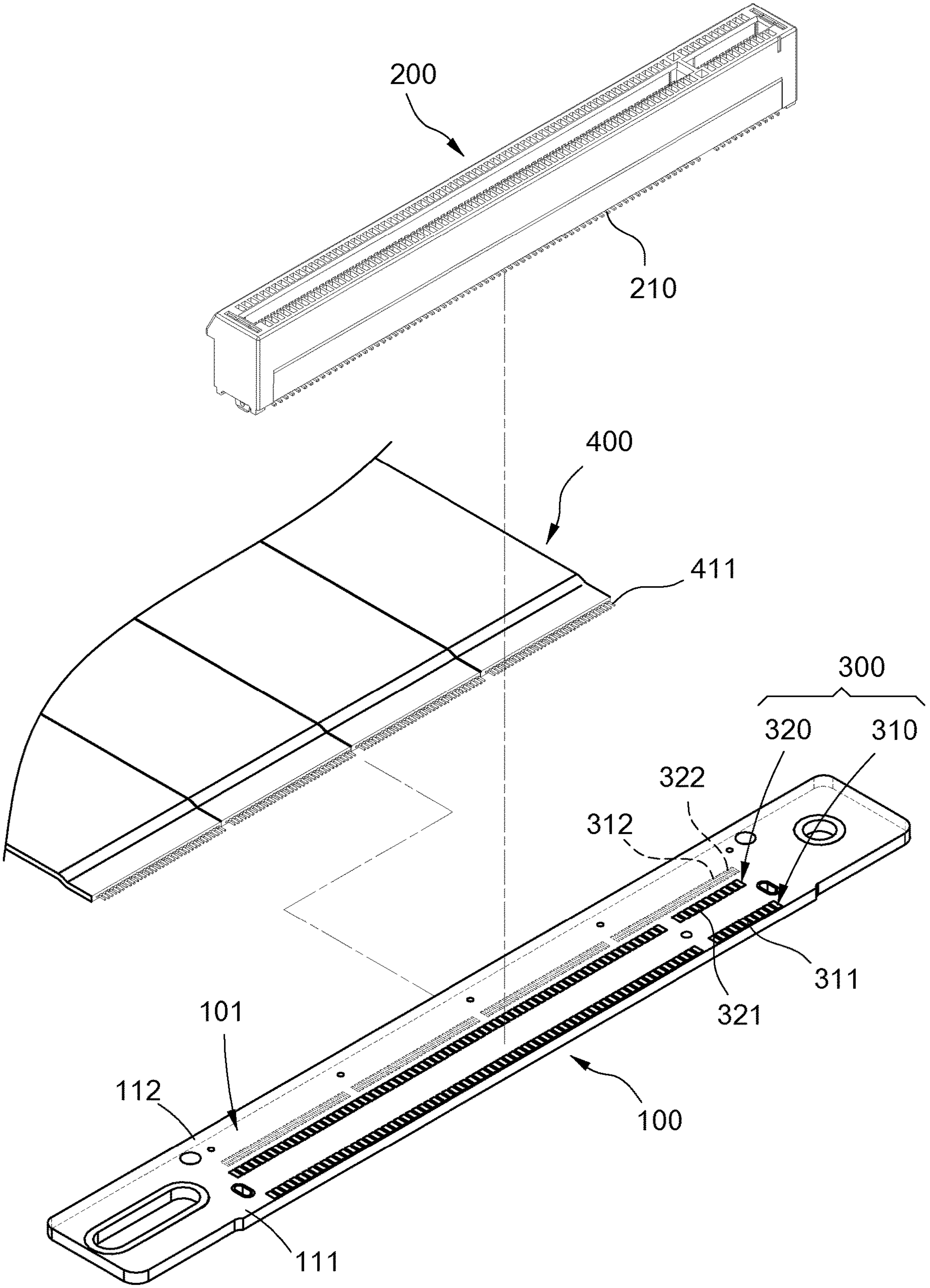
FIG. 7 is an exploded schematic view of the bus connecting cable of the disclosure.

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIGS. 5-8, an embodiment of the disclosure provides a bus connecting cable, which includes a circuit board 100, a connector 200, multiple circuits 300 disposed on the circuit board 100, and a cable 400.

In the embodiment, the circuit board 100 is of a strip shape and has a component side 111 and a wiring side 112 opposite to the component side 111. The circuit board 100 includes a top surface 101 and a bottom surface 102 opposite to the top surface 101.

The connector 200 is upright arranged on the top surface 101 of the circuit board 100 and includes multiple first terminals 210 in one row and multiple second terminals 220 in another row. The first terminals 210 and the second terminals 220 are parallelly arranged at an interval. In the embodiment, the connector 200 with the PCIe specification is taken as an example, but not limited to this.

Figure 9:
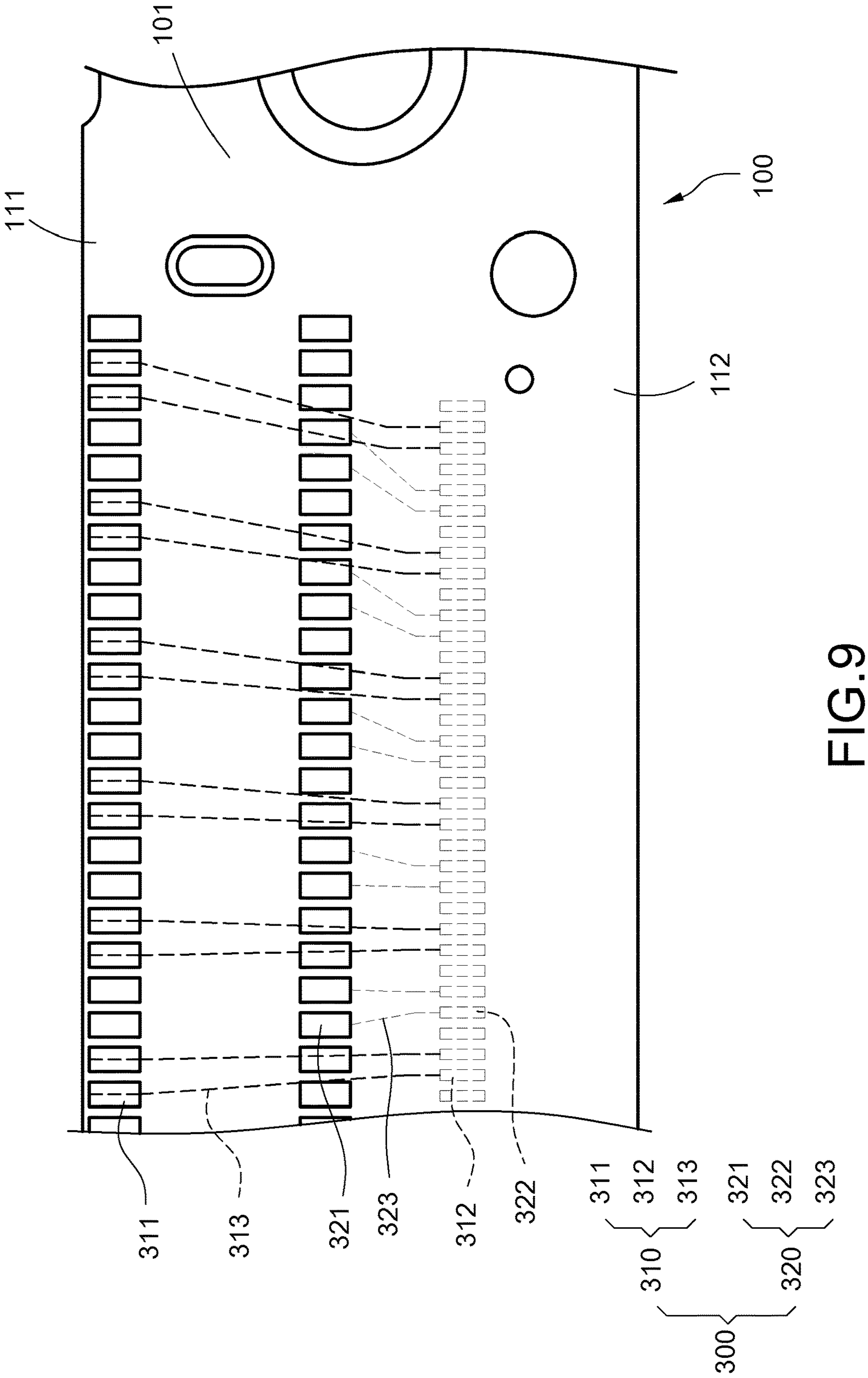
FIG. 9 is a layout view of the circuit on the circuit board of the bus connecting cable of the disclosure.

Please refer to FIG. 9, which show the arrangement of the circuits 300 on the circuit board 100. The circuits 300 disposed on the circuit board 100 include multiple first circuits 310 and multiple second circuits 320.

Figure 10:
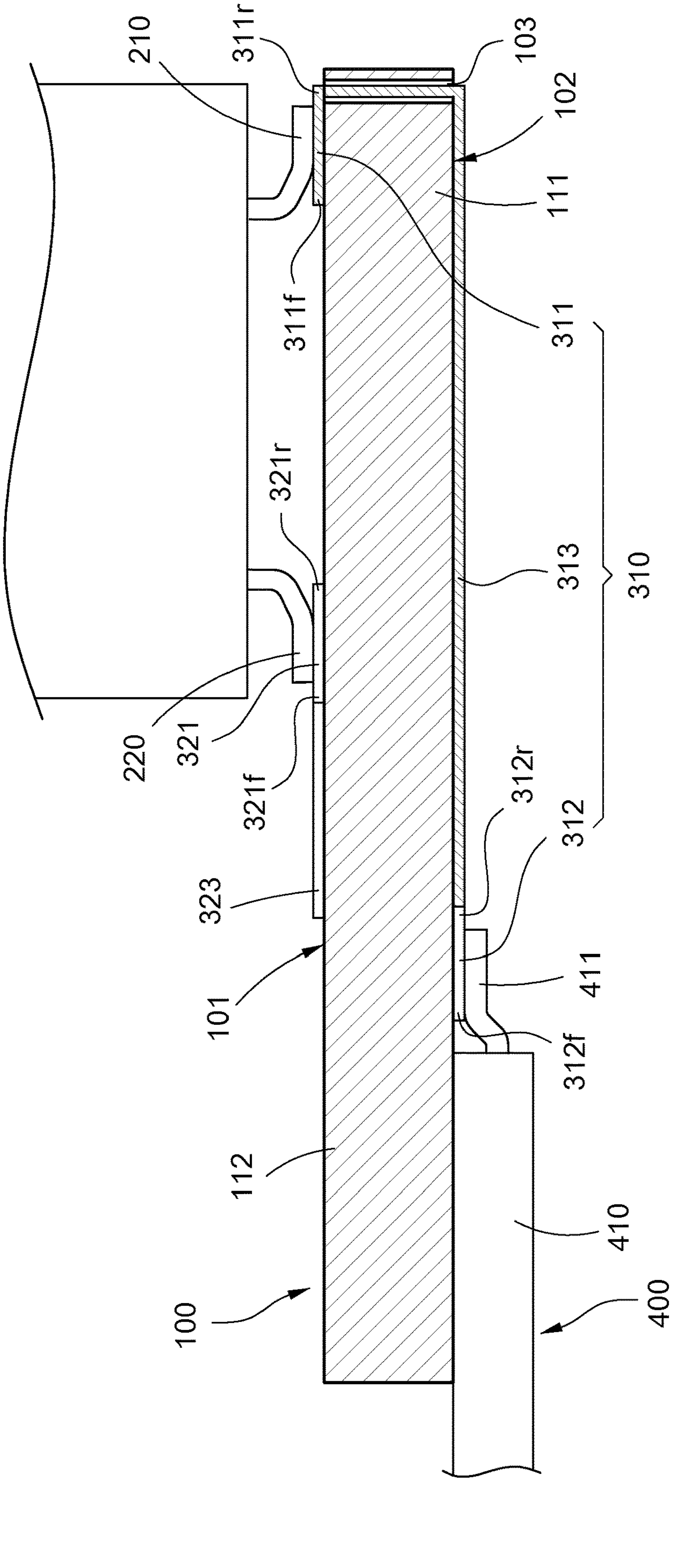
FIG. 10 is a schematic view of the arrangement of the first circuit on the circuit board of the bus connecting cable of the disclosure.
Figure 11:
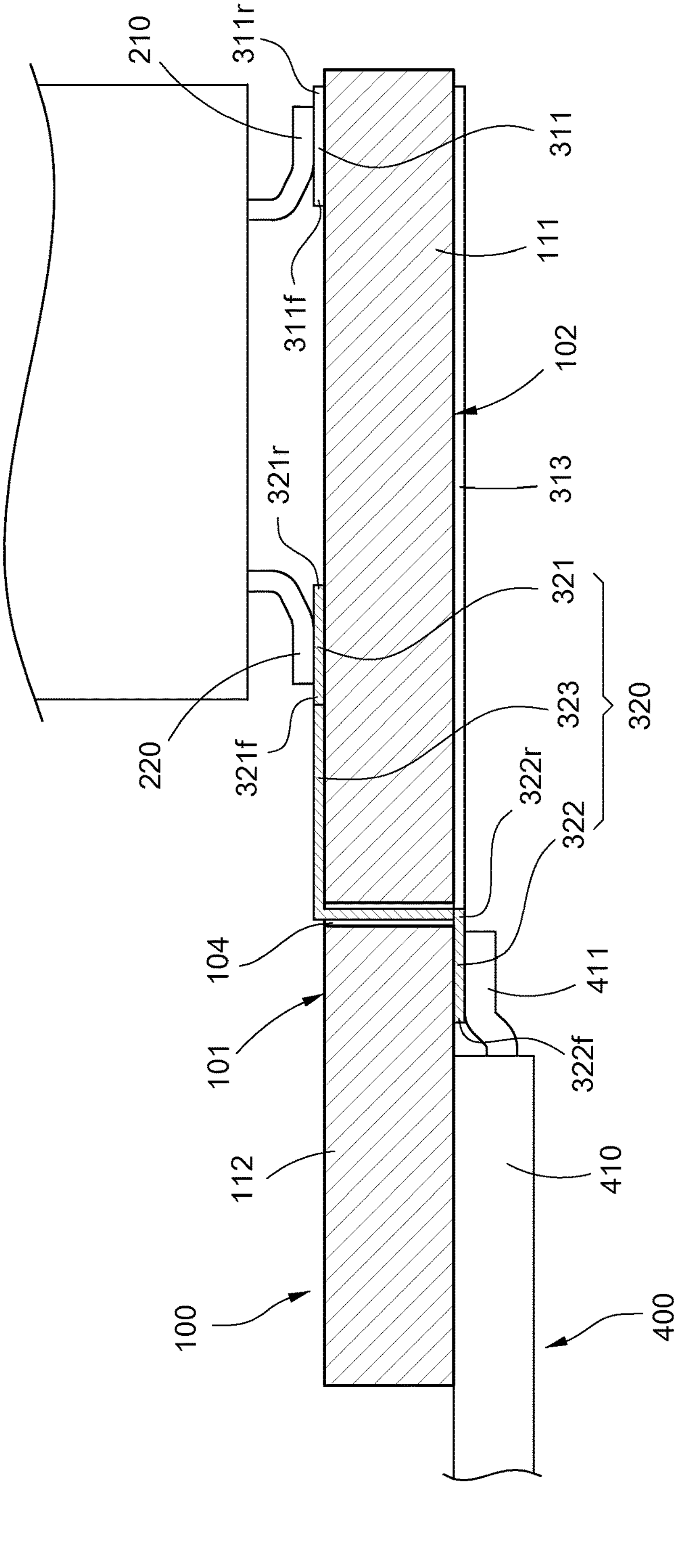
FIG. 11 is a schematic view of the arrangement of the second circuit on the circuit board of the bus connecting cable of the disclosure.

As shown in FIGS. 10 and 11, corresponding to the circuits 300, the circuit board 100 has a plurality of via holes penetrating the circuit board 100, the plurality of via holes have a plurality of first via holes 103 respectively corresponding to the first circuits 310 and a plurality of second via holes 104 respectively corresponding to the second circuits 320. Only one of the first via holes 103 and one of the second via holes 104 are shown in FIGS. 10 and 11 for illustrating.

As shown in FIGS. 9 and 10, each first circuit 310 is disposed through the first via hole 103 correspondingly to penetrate the circuit board 100. Each first circuit 310 includes a first top end 311, a first bottom end 312 and a first extending segment 313. In each first circuit 310, the first top end 311 and the first bottom end 312 are respectively located at two ends of the first circuit 310, and the first extending segment 313 is connected between the first top end 311 and the first bottom end 312 correspondingly. The first top end 311 is exposed and disposed on the top surface 101 of the circuit board 100. The first bottom end 312 is exposed and disposed on the bottom surface 102 of the circuit board 100. The first top ends 311 are respectively connected to the first terminals 210. On the component side 111, each first circuit 310 is extended from each first top end 311 to penetrate through the circuit board 100 and further extended along the bottom surface 102 of the circuit board 100 to each first bottom end 312. Each first extending segment 313 is extended along the bottom surface 102 to cross the connector 200. In the embodiment, the first extending segment 313 is extended on the bottom surface 102, and a cover layer may be disposed on the bottom surface 102 of the circuit board 100 to cover the first extending segments 313.

According to FIGS. 9 and 11, each second circuit 320 is disposed through the second via hole 104 correspondingly to penetrate the circuit board 100, and each second circuit 320 includes a second top end 321 on the top surface 101 and a second bottom end 322 on the bottom surface 102. The second top ends 321 are respectively connected to the second terminals 220. Each second circuit 320 has a second extending segment 323. In each second circuit 320, the second extending segment 323 is connected between the second top end 321 and the second bottom end 322 correspondingly. Each second circuit 320 is extended from each second top end 321 to the wiring side 112 along the top surface 101 and penetrates through the circuit board 100 to each second bottom end 322. In the embodiment, the second extending segment 323 is extended along the top surface 101. A covering layer may be arranged on the top surface 101 to cover the second extending segment 323.

As shown in FIGS. 10 and 11, each of the first circuits 310 and each second circuits 320 passes through one of the via holes (first via holes 103, second via holes 104), so that the loss of signal transmission in each first circuit 310 at the portions passing through the via hole is equal to that of each second circuit 320. Although this arrangement may have some losses of signal transmission in the second circuits 320 (the second via holes 104 lead to loss of signal transmission), qualities of signal transmission in the first circuits 310 and the second circuits 320 may be maintained uniform.

As shown in FIG. 10, in each first circuit 310, the first top 311 thereof has a front edge **311*f* and a rear edge 311*r*, and the front edge 311*f* of the first top 311 is closer to the wiring side 112 than the rear edge 311*r* of the first top 311; the bottom end 312 has a front edge 312*f* and a rear edge 312*r*, and the front edge 312*f* of the first bottom end 312 is closer to the wiring side 112 than the rear edge 312*r* of the first bottom end 312; a distal end of the first terminal 210 corresponding to the first circuit 310 is extended from the front edge 311*f* of the first top end 311 toward the rear edge 311*r* of the first top end 311. In each first circuit 310, in order to prevent the first circuit 310 from a loss of the signal transmission quality in a path from the first terminal 210 to the first bottom end 312 caused by a stub effect, the first via hole 103 is extended to penetrate the circuit board 100 at the rear edge 311*r* of the first top end 311, and the first extending segment 313 of the first circuit 310 is extended from the rear edge 311*r* of the first top end 311 through the first via hole 103 and further extended along the bottom surface 102 of the circuit board 100 toward the wiring side 112 to the rear edge 312*r* of the first bottom end 312. Similarly, as shown in FIG. 11, in each second circuit 320, the second top 321 thereof has a front edge 321*f* and a rear edge 321*r*, and the front edge 321*f* of the second top 321 is closer to the wiring side 112 than the rear edge 321*r* of the second top 321; the second bottom end 322 has a front edge 322*f* and a rear edge 322*r*, and the front edge 322*f* of the second bottom end 322 is closer to the connection side 112 than the rear edge 322*r* of the second bottom end 322; a distal end of the second terminal 220 corresponding to the second circuit 320 is extended from the rear edge 321*r* of the second top end 321 toward the front edge 321*f* of the second top end 321. In each of the second circuits 320, in order to avoid losses of signal transmission quality caused by a stub effect occurred in a path of the second circuit 320 extending from the second terminal 220 to the second bottom end 322, the second via hole 104 is disposed to penetrated the circuit board 100 at the rear edge 322*r* of the second bottom end 322, the second extending segment 323 of the second circuit 320 is extended from the front edge 321*f* of the second top end 321 toward the wiring side 112 along the top surface 101 of the circuit board 100 to the second via hole 104 and extended through the second via hole 104 to be connected to the rear edge 322*r* of the second bottom end 322**.

According to FIG. 9, the row of first bottom ends 311 and the row of second bottom ends 321 are parallelly arranged at an interval and respectively extended along the component side 111. The row of second top ends 321 is more adjacent to the wiring side 112 than the row of first top ends 311. The first bottom ends 312 and the second bottom ends 322 are arranged along the bottom surface 102. In detail, the first bottom ends 312 and the second bottom ends 322 are alternately arranged along the bottom surface 102 in a row, and the first bottom ends 312 and the second bottom ends 322 are arranged along the wiring side 112, but not limited to this. For example, the first bottom ends 312 and the second bottom ends 322 may be alternately arranged along the bottom surface 102 in multiple rows. The disclosure does not limit the order of the alternate arrangement of the first bottom ends 312 and the second bottom ends 322. For example, a single first bottom end 312 and a single second bottom end 322 are alternatively arranged in order, a single first bottom end 312 and multiple second bottom ends 322 in a group are alternatively arranged in order, multiple first bottom ends 312 in a group and a single second bottom end 322 are alternatively arranged in order, or multiple first bottom ends 312 in a group and multiple second bottom ends 322 in a group are alternatively arranged in order, etc. Specifically, the first bottom ends 312 may be arranged scatteredly so as to increase the intervals between a part of the first bottom ends 312 and another adjacent first bottom ends 312, thereby preventing the first bottom ends 312 from a crowded arrangement which may lead to large offset between the first bottom ends 312 and the first top end 311 corresponding thereto, so that lengths of the first extending segments 313 are effectively reduced and length differences between the first extending segments 313 are reduced as well. The second bottom ends 322 are alternately arranged with the scattered first bottom ends 312, in order to avoid over deviations between the second bottom end 322 and the corresponding second top end 311 corresponding thereto, so that lengths of the second extending segments 323 are effectively reduced and length differences between the second extending segments 323 are reduced as well.

According to FIGS. 5 to 8, the cable 400 includes multiple conductor 410, each conductor 410 is of a wire shape, the conductors 410 are disposed side by side in a row and connected to each other to form a belt (or band) shape or multiple belts disposed side by side. The conductors 410 are respectively soldered to the first bottom ends 312 and the second bottom ends 322. That is, each conductor 410 is correspondingly soldered with one of the first bottom ends 312 and the second bottom ends 322. Specifically, the conductors 410 are sequentially soldered to the first bottom end 312 and the second bottom end 322 arranged alternately.

Figure 8:
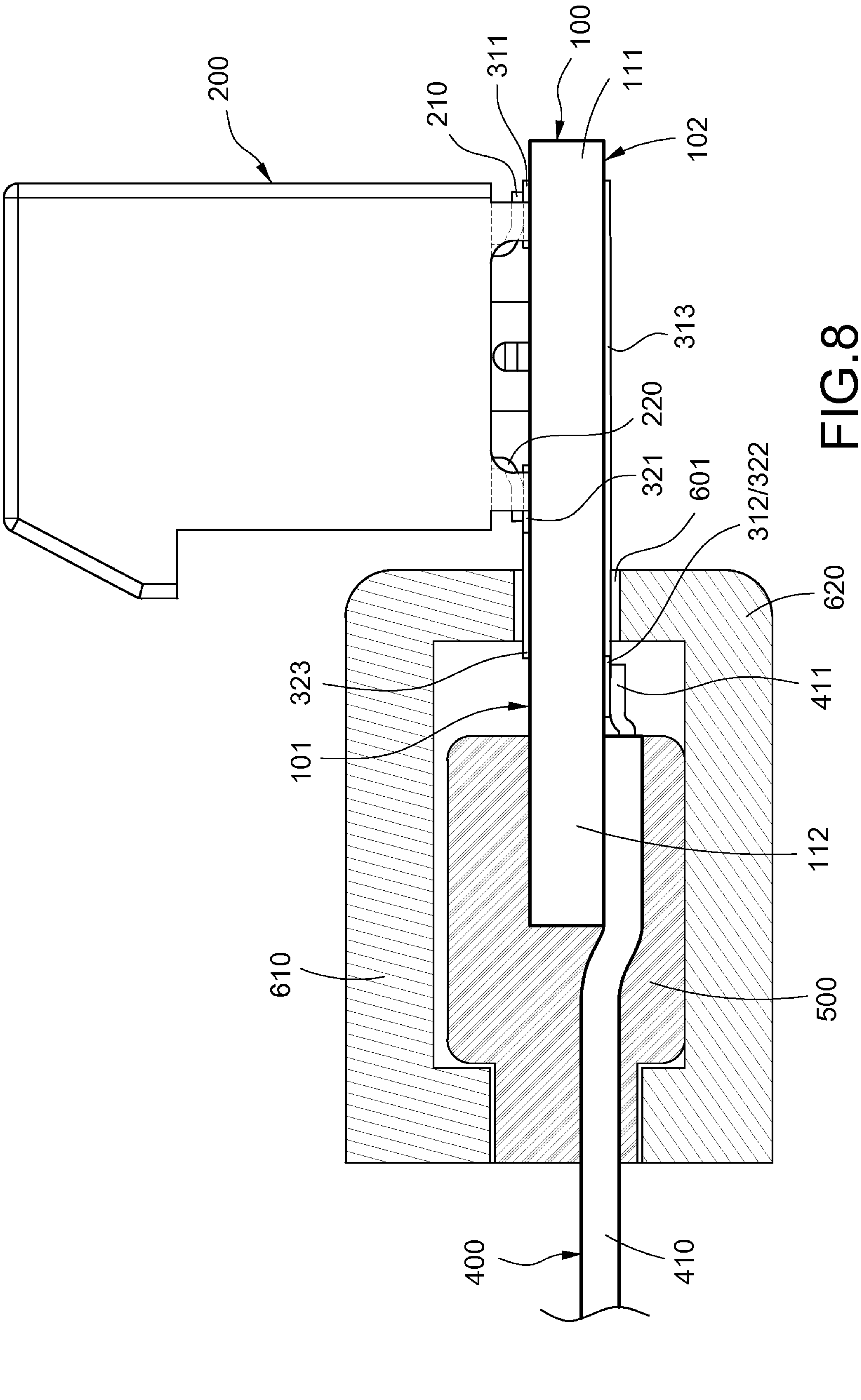
FIG. 8 is a side view of the bus connecting cable of the disclosure.

According to FIG. 8, in an embodiment of the disclosure, the bus connecting cable further includes a positioning block 500 disposed on the wiring side 112 of the circuit board 100. Part of an edge of the circuit board 100 is buried in the positioning block 500. Part of each conductor 410 is buried in the positioning block 500 to position the conductors 410 on the circuit board 100. In detail, the positioning block 500 may be formed on the edge of the circuit board by injection molding. Each conductor 410 has a soldering end 411 projecting from the positioning block 500. The soldering ends 411 are respectively arranged and positioned corresponding to the first bottom ends 312 or the second bottom ends 322. Each soldering end 411 is soldered to a corresponding one of the first bottom ends 312 or the second bottom ends 322. The positioning block 500 may fix the relative position of each conductor 410 and the corresponding first bottom end 312 or second bottom end 322 to facilitate soldering and prevent each soldering end 411 from falling off from the circuit board 100.

According to FIGS. 5 to 8, in an embodiment of the disclosure, the bus connecting cable further includes a pair of shells 610, 620 fastened to the circuit board 100. The pair of shells 610, 620 clamps the wiring side 112 of the circuit board 100. The positioning block 500 and the soldering ends 411 are received in the shells 610, 620 to prevent the junction of the cable 400 and the circuit board 100 from being collided. Each casing 610, 620 has an avoiding opening 601, the first circuits 310 and the second circuits 320 are allowed to pass therethrough respectively, and the first circuits 310 and the second circuits 320 are respectively separated from the casing 610, 620 corresponding thereto. The housings 610, 620 are generally made of polypropylene plastic (Polypropylene, PP), dielectric coefficients (Dk) of the housings 610, 620 are approximately 2.1, and a dielectric coefficient (Dk) of air is 1.00054. The avoiding openings 601 prevent the housings 610, 620 from contacting the first circuit 310 and the second circuit 320 respectively so as to prevent the dielectric coefficients (Dk) of the first circuits 310 and the second circuits 320 from increasing, and losses of signal transmission are reduced.

In the bus connecting cable of the disclosure, all of the first circuit 310 and the second circuit 320 penetrate through the circuit board 100 to reduce the impedance difference between the first circuit 310 and the second circuit 320. The first extending segments 313 and the second extending segments 323 are respectively disposed on two sides of the circuit board 100 to effectively use the layout space so as to prevent the second extending segments 323 from compressing layout space of the first extending segments 313. The first bottom end 312 and the second bottom end 322 are alternately arranged along the bottom surface 102 of the circuit board 100 in a row to reduce the length difference between the first circuits 310 and reduce the length difference between the second circuits 320. As a result, the impedance difference between the circuits 300 may be reduced.

The bus connecting cable of this disclosure has the first bottom end 312 of the first circuit 310 and the second bottom end 322 of the second circuit 320 which are disposed on the bottom surface 102 of the circuit board 100 and alternately arranged in a row, and it is therefore suitable for cables 400 or scattered conductors 410, and the conductors 410 of the cable 400 are not necessary to be overlapped with each other. Moreover, the first bottom ends 312 and the second bottom ends 322 are arranged scatteredly and alternately so that wiring distance of the first extending segment 313 and wiring distance of the second extending segment 323 in the circuit 300 on the circuit board 100 are decreased, and the first extending segments 313 and the second extending segments 323 have small length differences respectively. The first extending segment 313 and the second extending segment 323 are disposed extensively on the top surface 100 and the bottom surface 102 of the circuit board 100 so that the first extending segment 313 and the second extending segment 323 are prevented from a parallel arrangement, and crosstalk is therefore reduced. All of the conductors 410 are all soldered to the bottom surface 102 of the circuit board 100, and this single-side structure is easy to be processed.

While this disclosure has been described by means of specific embodiments, numerous modifications and variations could be made thereto by those skilled in the art without departing from the scope and spirit of this disclosure set forth in the claims.

What is claimed is:

1. A bus connecting cable, comprising:

a circuit board, comprising a top surface and a bottom surface opposite to the top surface;

a connector, upright arranged on the top surface, and comprising a plurality of first terminals and a plurality of second terminals;

a plurality of circuits, arranged on the circuit board, comprising a plurality of first circuits and a plurality of second circuits, each first circuit penetrating through the circuit board and comprising a first top end located on the top surface and a first bottom end located on the bottom surface, a plurality of first top ends connected to each first terminal, each second circuit penetrating through the circuit board and comprising a second top end located on the top surface and a second bottom end located on the bottom surface, a plurality of second top ends connected to each second terminal, and a plurality of first bottom ends and a plurality of second bottom ends arranged along the bottom surface; and a cable, comprising a plurality of conductors parallelly connected to each other, and the conductors soldered to the first bottom ends and the second bottom ends respectively.

2. The bus connecting cable of claim 1, wherein each first circuit comprises a first extending segment connected between the first top end and the first bottom end, and the first extending segment is extended along the bottom surface to cross the connector.

3. The bus connecting cable of claim 1, wherein the circuit board comprises a plurality of via holes defined thereon corresponding to the circuits, and each circuit passes through one of the via holes.

4. The bus connecting cable of claim 1, wherein the first bottom ends and the second bottom ends are alternately arranged in a row.

5. The bus connecting cable of claim 4, wherein the conductors of the cable are disposed side by side in a row to be a band shape, and the conductors are sequentially soldered to the first bottom ends and the second bottom ends arranged alternately.

6. The bus connecting cable of claim 1, further comprising a pair of shells, wherein the pair of shells are configured to clamp the wiring side of the circuit board, and the soldering end is received in the pair of shells.

7. The bus connecting cable of claim 6, wherein each of the shells comprises an avoiding opening, the circuits are disposed separately from the shell through the avoiding opening.

8. The bus connecting cable of claim 1, wherein the circuit board is of a strip shape and comprises a component side and a wiring side opposite to the component side, the first top ends and the second top ends are arranged spacedly and extended along the component side, and the second top ends is closer to the wiring side than the first top ends.

9. The bus connecting cable of claim 8, wherein the first bottom ends and the second bottom ends are arranged along the wiring side.

10. The bus connecting cable of claim 8, wherein the circuit board comprises a plurality of via holes defined thereon corresponding to the circuits, and the via holes comprise a plurality of first via holes corresponding to the first circuits respectively:

wherein, in each first circuit, a front edge of the first top end is closer to the wiring side than a rear edge of the first top end, a front edge of the first bottom end is closer to the wiring side than a rear edge of the first bottom end, a distal end of the first terminal corresponding to the first circuit is extended from the front edge of the first top end to the rear edge of the first top end, the first via hole corresponding to the first circuit penetrates the circuit board from the rear edge of the first top end;

wherein each first circuit comprises a first extending segment;

wherein the first extending segment is connected between the first top end and the first bottom end in each first circuit, the first extending segment of the first circuit is extended from the rear edge of the first top end through the first via hole and further extended toward the wiring side along the bottom surface of the circuit board to the rear edge of the first bottom end.

11. The bus connecting cable of claim 8, wherein the circuit board comprises a plurality of via holes defined thereon corresponding to the circuits, and the via holes comprise a plurality of second via holes corresponding to the second circuits respectively;

wherein, in each second circuit, a front edge of the second to end is closer to the wiring side than a rear edge of the second top end, a front edge of the second bottom end is closer to the wiring side than a rear edge of the second bottom end, a distal end of the second terminal corresponding to the second circuit is extended from the rear edge of the second top end to the front edge of the second top end, the second via hole corresponding to the second circuit penetrates the circuit board from the rear edge of the second bottom end;

wherein each second circuit comprises a second extending segment;

wherein the second extending segment is connected between the second top end and the second bottom end in each second circuit, the second extending segment of the second circuit is extended from the front edge of the second top end to the second via hole along the top surface of the circuit board and further extended through the second via hole to be connected to the rear edge of the second bottom end.

12. The bus connecting cable of claim 8, further comprising a positioning block disposed on the wiring side of the circuit board, wherein a part of an edge of the circuit board is buried in the positioning block, a part of each conductor is buried in the positioning block, each conductor comprises a soldering end projecting from the positioning block, and the soldering end is soldered to the first bottom end or the second bottom end correspondingly.

13. The bus connecting cable of claim 12, further comprising a pair of shells, wherein the pair of shells are configured to clamp the wiring side of the circuit board, and the positioning block is received in the pair of shells.

* * * * *